Patented Mar. 29, 1949

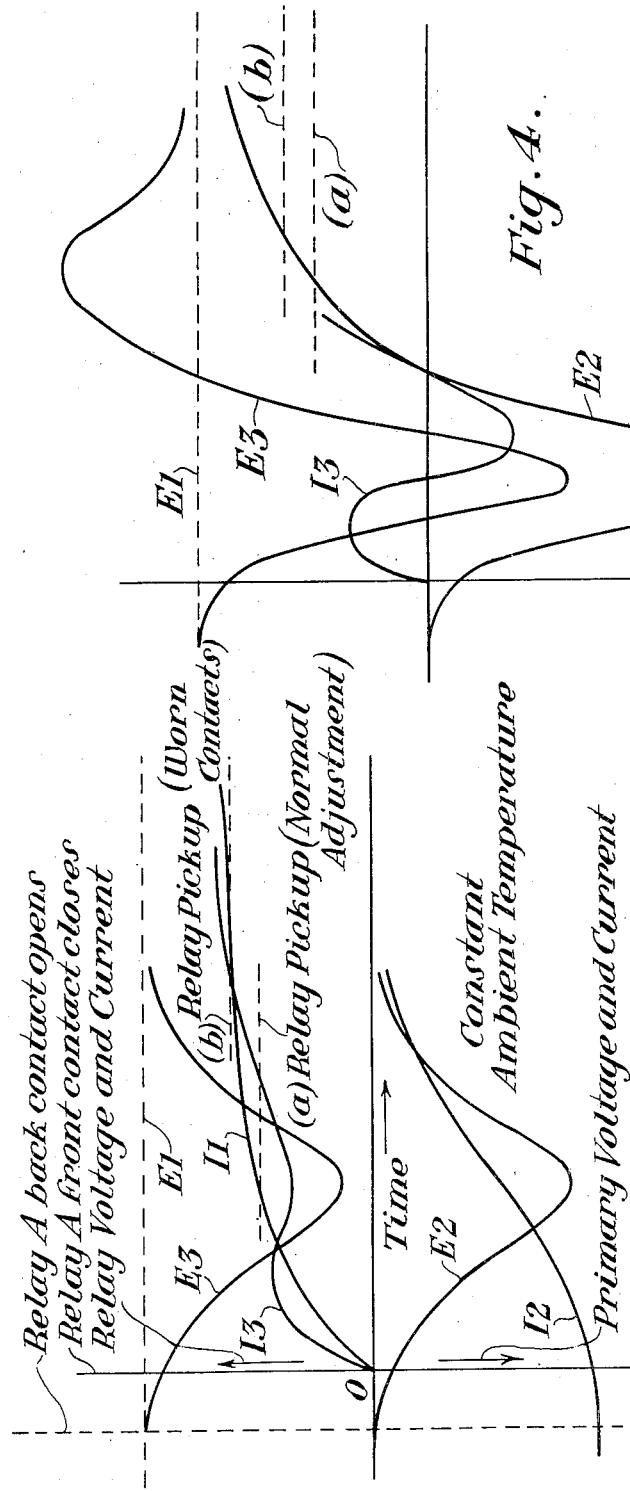
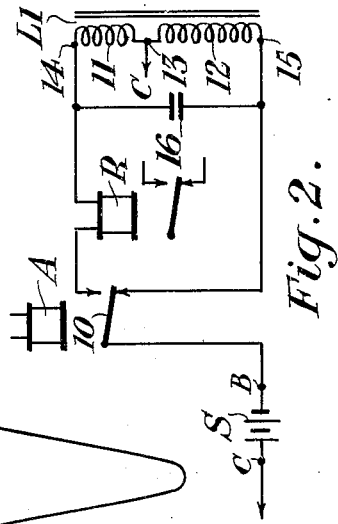
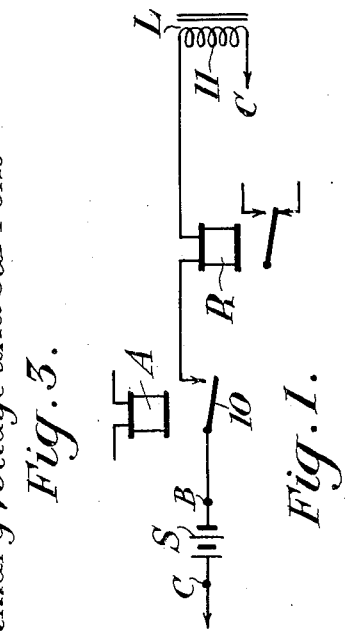

2,465,805

UNITED STATES PATENT OFFICE 2,465,805

RELAY CONTROL CIRCUITS

Andrew Hufnagel, Penn Township, Allegheny County, Pa., assignor to The Union Switch & Signal Company, Swissvale, Pa., a corporation of Pennsylvania Application August 8, 1946, Serial No. 689,111

5 Claims. (Cl. 175—320)

My invention relates to relay control circuits and particularly to circuits for maintaining the pick-up time of a relay within relatively close limits under variations of relay calibration, ambient temperature, battery voltage, etc.

In many relay applications, particularly in the field of railway signaling, a predetermined sequence of relay operation must be obtained in order that a particular desired result can be secured. For example, the entire operation of a relay system may depend upon the relative pick-up times of two or more relays and it is therefore essential to maintain the predetermined relative pick-up times of these relays under all possible variations of battery voltage, ambient temperature, relay calibration, etc., all of which factors enter into the determination of the time in which a relay picks up.

It is an object of my invention to provide a relay control circuit arranged to maintain the pick-up time of a relay within relatively close limits.

Another object of my invention is to provide a relay circuit incorporating an auxiliary voltage source cooperating with the relay source to provide a substantially uniform pick-up time for the relay under various conditions of ambient temperature, battery voltage, relay calibration, etc.

Another object of my invention is to provide a relay circuit incorporating a reactor and a condenser which serve to make more uniform the time in which the relay picks up under various different operating conditions.

Another object of my invention is to provide a relay circuit incorporating a condenser and a reactor having a winding connected in series with the relay and another winding inductively coupled with the first winding for creating a voltage in the first winding which operates to restrict the pick-up time of the relay within relatively close limits.

I shall describe one form of apparatus embodying my invention, and shall then point out the novel features thereof in claims.

In the accompanying drawings, Fig. 1 is a diagrammatic view of an ordinary relay control circuit. Fig. 2 is a diagrammatic view of a preferred form of apparatus embodying my invention. Fig. 3 is a graphical representation of the voltage and current relations in various portions of the apparatus represented in Figs. 1 and 2. Fig. 4 is another graphical representation of current and voltage relations obtainable in the apparatus of Fig. 2.

Referring to Fig. 1, the reference character R designates an electromagnetic relay provided with an energizing circuit including an external inductance L having a winding 11 mounted on a magnetizable core and connected in series with the winding of relay R across a suitable source of unidirectional current, such as a battery S having its opposite terminals designated by the reference characters B and C, at such times as a control contact 10 operated by a governing relay A is closed in its front position.

The circuit arrangement shown in Fig. 1 is one of the well-known expedients used to delay the pick-up of a relay and therefore provides relay R with slow pick-up characteristics. The pick-up time of relay R constitutes the time elapsing between the closing of front contact 10 of relay A, which completes the energizing circuit for the winding of relay R, and the closing of the front contacts of relay R under the influence of the magnetic flux resulting from the energization of the winding of relay R.

The pick-up time of relay R in the circuit arrangement shown in Fig. 1 is affected by various factors such as applied voltage, ambient temperature, relay calibration, etc. That is, under specified conditions of applied voltage, ambient temperature and armature travel, relay R in the circuit of Fig. 1 will have a definite pick-up time. If any one of the three factors is varied, the pick-up time of relay R will likewise be varied. For example, a decrease in applied voltage results in an increase in the relay pick-up time because the current in the relay will build up to the pick-up value at a slower rate; an increase in the ambient temperatures results in an increased resistance in the relay circuit to limit the current and cause it to build up to its pick-up value at a slower rate; while if a change in relay calibration should occur, that is, if the back points of the relay should wear to the point where the relay armature has a wider opening, then the relay pick-up time is increased because in such event a higher current level is required to cause the armature to pick up, and more time is required for the current in the relay to build up to this higher level.

The curve 11 of Fig. 3 shows graphically how the pick-up time of relay R of Fig. 1 varies upon a change in relay calibration; the applied voltage and ambient temperature remaining constant. Referring to Fig. 3, the abscissa represents time measured from the zero (0) point established when control contact 10 of relay A closes in its front position to complete the energizing circuit of relay R. The dotted line E1 represents the voltage available at the terminals B and C and applied across the winding of relay R and winding 11 of reactor L. The dotted line $a$ designated "Relay pick-up (normal adjustment)" represents the current level required in the relay to pick up its armature under normal adjustments of the front and back contacts, while the other dotted line $b$ designated "Relay pick-up (worn contacts)" indicates the increased current required in the relay to cause its armature to pick up when the relay calibration has been altered by a wearing of the back contacts which results in forcing the armature to travel a greater distance from its back points.

For the circuit of Fig. 1, the relation of current in the circuit of relay R, to time is represented in Fig. 3 by the curve I1. The point at which curve I1 cuts dotted line $a$ (measured along the abscissa) indicates the time at which the current in relay R builds up to the normal pick-up value of the relay and therefore determines the time at which the front contacts of the relay close under normal conditions of contact adjustment, while the point at which curve I1 cuts dotted line $b$ represents the time required for the current in the relay to build up to the higher value necessary to operate the relay armature when the relay calibration has been changed because of worn contacts, and therefore determines the time at which the front contacts of relay R close under conditions of worn back contacts.

The effect of a decreased applied voltage, or increased ambient temperature, on the pick-up time of relay R of Fig. 1 can be visualized in Fig. 3 because either factor will cause the current in the circuit of relay R to increase at a slower rate than that represented by curve I1, so that as a result the current curve under such assumed conditions will cut the line $a$ at a point more distantly removed from the zero position than the intersection of curve I1 with line $a$. The pick-up time of relay R under such conditions will therefore be lengthened by a decrease in applied voltage or increase of ambient temperature.

In Fig. 2 I have represented the apparatus of Fig. 1 modified in accordance with my invention to restrict to within relatively close limits the variations in pick-up time of relay R caused by changes in applied voltage, ambient temperature, relay calibration, etc. This restriction is obtained by superimposing on the circuit of relay R when contact 10 of relay A is operated to its front position to energize the relay R, a damped sinusoidal voltage which initially opposes and which may later aid the voltage applied to relay R over contact 10 of relay A.

Referring to Fig. 2, the reactor L of Fig. 1 has been replaced by another reactor L1 having its winding disposed on a magnetizable core and divided into one portion 11 and another portion 12 by a terminal 13 intermediate the two end terminals 14 and 15 of the reactor coil. A capacitor 16 is connected across the end terminals 14 and 15 of the reactor winding. It will be assumed that the turns of winding portions 11 and 12 are wound in the same direction on the core of the reactor, and under the conditions assumed one terminal C of source S is connected to mid terminal 13, and the other terminal B of source S is connected either to terminal 15 or terminal 14 of reactor L1 according as contact 10 of relay A is in its back position or front position, respectively, so that when relay A is released winding portion 12 of reactor L1 is energized. When relay A is picked up, its back contact 10 opens to deenergize winding portion 12 of reactor L1, and its front contact 10 closes to connect source S across relay R in series with winding portion 11 of reactor L1.

When contact 10 of relay A is operated from its back to its front position, reactor L1 of Fig. 2 functions as a transformer comprised of portion 12 as a primary winding and winding portion 11 as a secondary winding, and in conjunction with condenser 16, induces a sinusoidal voltage which is superimposed on the voltage of source S applied over contact 10 across relay R and winding 11 in series. The relations of the voltages and currents in the various portions of the apparatus of Fig. 2 are graphically represented by the curves E1, E2, E3, I2 and I3 of Fig. 3, and the operation of the apparatus of Fig. 2 can best be understood in connection with a discussion of the curves of Fig. 3.

The vertical dotted line shown to the left of the zero (0) position of Fig. 3 represents the time at which back contact 10 of relay A opens with relation to the time at which front contact of relay A closes to establish, as pointed out hereinbefore, the zero (0) position of the graphical representation. The time elapsing between the opening of the back and closing of the front contact 10 of relay A therefore represents the period required for the armature of relay A to travel between its back and front contact points. The dotted horizontal line E1 represented the voltage available at terminals B and C applied across winding 12 of reactor L1 when back contact 10 of relay A is closed, and likewise the voltage applied across the winding of relay R and winding 11 of reactor L1, in series, when front contact 10 of relay A is closed. The curve I2 represents the current in winding 12 of reactor L1. When back contact 10 of relay A is closed, the current in winding 12 is at a constant value as indicated by the portion of curve I2 to the left of the dotted vertical line representing the point at which back contact 10 opens. When the back contact opens, the current in winding 12 is at first substantially maintained by discharge of capacitor 16 and then begins decaying to induce a voltage E2 in secondary winding 11 of reactor L1. The voltage, represented by the curve E2, induced in secondary winding 11 will at any given instant be substantially proportional to the rate of change of current I2 in winding 12, and will be of a sinusoidal nature having a direction opposing the battery voltage E1 applied across relay R and winding 11 when front contact 10 of relay A closes, so that the winding of relay R is energized by a voltage, represented by curve E3, which is equal to the voltage E1 of source S minus the voltage E2 induced in winding 11. The curve I3 shows the inductive rise of current in relay R due to the resultant voltage E3 applied to the relay. It will be noted from an inspection of the curves of Fig. 3 that the current represented by curve I3 initially rises more rapidly than the current represented by curve I1, this characteristic being obtained by making winding 11 of Fig. 2 considerably less inductive than winding 11 of Fig. 1. Accordingly it follows that but for the induced voltage E2, the relay current of Fig. 2 would rise under the influence of the applied battery voltage, along a curve shaped somewhat similar to that of curve I1 but much steeper. After the current represented by curve I3 initially rises more rapidly than curve I1, it decreases and falls due to the subtractive effect of the induced voltage E2, and then begins to rise again at a steeper rate than curve I1 so that it cuts dotted lines $a$ and $b$ intermediate the points at which curve I1 cuts such lines. It will be seen from an inspection of Fig. 3 that curve I3 cuts dotted line $b$ at a time value which is relatively close to the value at which that curve cuts dotted line $a$, while the curve I1 cuts dotted line $b$ at a time value relatively far removed from the value at which the same curve cuts the dotted line $a$. Since the dotted lines $a$ and $b$ represent two conditions of relay calibration, it is apparent that for the same variation in calibration the use of the apparatus of Fig. 2 results in restricting the variation in relay pick-up time to a much smaller value then is obtained with the apparatus of Fig. 1. The circuit of Fig. 2 therefore provides a much more uniform pick-up time for the relay in the case of variations in relay calibration.

The limitation of the variations in pick-up time of the relay of Fig. 2 is obtained by making the relay more slow to pick up with normal contact adjustment and quicker to pick up with worn contacts, than a relay in the circuit of Fig. 1 under the same conditions. As a result, therefore, the pick-up time of relay R in Fig. 2 is limited to a narrow range so that the relative pick-up time of relay R compared to another relay in a system can be more definitely determined and therefore the system can be designed with assurance that the relative pick-up values of different control relays can be maintained to assure proper operation of the system.

The manner in which the apparatus of Fig. 2 will operate to limit the variations in pick-up time of relay R occasioned by a decrease in applied voltage, or increase in ambient temperature, can be understood from the curves of Fig. 3 because each of the factors mentioned effects a change in pick-up time comparable to that introduced by a change in relay calibration. As indicated in Fig. 3, the curve I3, inherently has a steeper slope at the point where the curve cuts lines $a$ and $b$ representing the normal and worn contact pick-up values of the relay, consequently with the apparatus of Fig. 2 any change of applied voltage or ambient temperature will result in slightly lowering or raising the current curve I3, which however will retain the relatively steep slope at the point at which it cuts the line representing pick-up current of the relay, so that the points at which the current curve cuts the pick-up level line in Fig. 3 under various conditions of applied voltage and ambient temperature will be more closely adjacent in the case of the apparatus of Fig. 2 than in the case of Fig. 1.

The curves shown in Fig. 4 illustrate the voltage-current relationships of the apparatus of Fig. 2 with the parts so selected and proportioned that the peak of induced voltage E2 is made to have a value in excess of the voltage E1 of source S, thus providing a resultant voltage in relay R which varies as indicated by the curve E3 of Fig. 4. As indicated, for a portion of the time the voltage E3 reverses, and then becomes unidirectional and increases at a rapid rate. The current I3 in the relay has a steeper slope at the point at which the curve cuts pick-up energy level line $a$ of Fig. 4 so that the curve I3 cuts line $b$ within a narrower range of values than is the case with curve I3 of Fig. 3. The sinusoidal character of voltage curves E2 and E3 and of current curve I3 is particularly apparent in Fig. 4 since the parts of the circuit in which these voltage and current relationships are developed have been proportioned so that the induced voltage E2 oscillates through substantially a full cycle before becoming damped out, while with the constants used for the voltage and current values represented by the curves E2, E3, and I3 of Fig. 3, the induced voltage E2 of Fig. 3 becomes damped out in a single half-cycle.

From the foregoing discussion it is apparent that variations in pick-up time of a relay may be limited to within a relatively small range by means effective to impose a sinusoidal voltage on the relay circuit when the relay circuit is first established. In imposing these means, the relay circuit is made less inductive so that but for these means, the relay current would rise more rapidly upon application of the battery voltage. The sinusoidal voltage is introduced into the relay circuit in such a fashion as initially to oppose the rise of relay current, and may later operate to assist this current rise. By these means the relay is made slow in picking up and the rise in relay current in the vicinity of its actual pick-up value is made so rapid that the overall pick-up time of the relay is but little affected by variable factors such as applied voltage, ambient temperature, and relay calibration.

Although I have herein shown and described only one form of a relay control circuit embodying my invention, it is to be understood that various changes and modifications may be made therein within the scope of the appended claims without departing from the spirit and scope of my invention.

Having thus described my invention, what I claim is:

1. In combination with an electromagnetic relay and a source of unidirectional current, two inductively coupled windings external to said relay, a control contact having a first and a second position, a circuit completed in the first position of said contact for applying the voltage of said source across the winding of said relay in series with a first of said two windings, a circuit completed in the second position of said contact for applying said source across the second of said two windings, and a capacitor connected across said second winding to provide a path for the decay of current in said second winding upon operation of said control contact from its second to its first position, said first and second windings being arranged with respect to each other so that upon decay of current in said second winding an electromotive force is induced in said first winding which opposes the voltage of said source applied to the circuit including the winding of said relay.

2. In combination with an electromagnetic relay and a source of unidirectional current, a first winding, a control contact having a first and a second position, a circuit completed in said first position of said contact for connecting the winding of said relay and said first winding in series across said source, a second winding inductively coupled with said first winding, a circuit completed by said control contact in its said second position connecting said second winding across said source, a capacitor connected across said second winding to provide a path for the decay of current in said second winding upon operation of said control contact from its said second to its said first position, said first and second windings being arranged with respect to each other so as to induce a voltage in said first winding upon decay of flux in said second winding for limiting the variation of pick-up time of the relay caused by a variation in any one or more of the factors of the voltage of said source, the ambient temperature, and the calibration of the electromagnetic relay.

3. In combination with an electromagnetic relay and a source of unidirectional current and a control contact having a first and a second position, a reactor having two inductively coupled windings, a first circuit completed in the first position of said control contact connecting said relay in series with one of said two reactor windings across said source, a second circuit completed in the second position of said control contact connecting the second of said two reactor windings across said source, said two reactor windings arranged with respect to each other and relative to the polarity of energizing current so as to induce in said one reactor winding upon decay of flux in said second reactor winding a voltage initially opposing the voltage impressed by said source across said first circuit and a capacitor connected across said two reactor windings.

4. In combination with an electromagnetic relay and a source of unidirectional current and a control contact having a first and a second position, a reactor having two inductively coupled windings, a first circuit completed in the first position of said control contact connecting said relay in series with one of said two reactor windings across said source, a second circuit completed in the second position of said control contact connecting the second of said two reactor windings across said source, one terminal of each of the two reactor windings being connected directly to the same terminal of said source, said two reactor windings arranged with respect to each other and relative to the polarity of energizing current so as to induce in said one reactor winding upon decay of flux in said second reactor winding a voltage initially opposing the voltage impressed by said source across said first circuit, and a capacitor connected across the other terminals of each of said two reactor windings.

5. In combination with an electromagnetic relay, a reactor having a winding comprising a number of turns wound in the same direction and provided with a tap intermediate its end terminals, a condenser connected across said end terminals of said reactor, a source of direct current having one terminal connected to said intermediate tap of said reactor winding, a control contact having a first and a second position, a circuit completed by said control contact in its said first position connecting the other terminal of said source to one end terminal of said reactor for energizing a first portion of the reactor winding between said one end terminal and said intermediate tap, and a circuit completed by said control contact in said second position connecting said other terminal of said source through the winding of said relay to the other terminal of said reactor winding for energizing said relay in series with a second portion of said reactor winding between said other end terminal and said intermediate tap, whereby the voltage of said source in said relay is opposed by the voltage induced in said second portion of said reactor winding by the decay of flux in said first portion of said reactor winding resulting from operation of said control contact from its said first to its said second position.

ANDREW HUFNAGEL.

REFERENCES CITED

The following references are of record in the file of this patent:

UNITED STATES PATENTS

| Number | Name | Date |
|---|---|---|
| 1,985,577 | Mishelevich | Dec. 25, 1934 |
| 2,133,511 | Heintz | Oct. 18, 1938 |
| 2,208,125 | Fimgold | July 16, 1940 |
| 2,311,034 | Dodd | Feb. 16, 1945 |